Aug. 17, 1965  M. H. BENEDICT  3,201,346
DEVICE AND METHOD FOR CLEANING CLEANER'S SOLVENT
Filed Sept. 10, 1962

INVENTOR.
Malcolm H. Benedict
BY
ATTORNEYS

# United States Patent Office 3,201,346
Patented Aug. 17, 1965

3,201,346
DEVICE AND METHOD FOR CLEANING CLEANER'S SOLVENT
Malcolm H. Benedict, Denver, Colo., assignor, by mesne assignments, to Lloyd A. Ottomeyer, Beverly Hills, Calif.
Filed Sept. 10, 1962, Ser. No. 222,599
6 Claims. (Cl. 210—24)

This invention relates to a device and method of cleaning cleaner's solvent.

Cleaning solvent, commonly termed "Perc," is utilized in a circulatory system in dry cleaning establishments involving storage of a major portion of the circulating solvent in a storage tank or container from which it is withdrawn and introduced into various cleaning stages as required. Following the cleaning operation, the solution is withdrawn from the treatment vessel and delivered into a return line, inclusive of a filtration stage, before it is introduced into the storage tank for subsequent reuse.

Filtration methods now in use are adequate to obtain a liquid-solids separation and a substantial amount of the impurities introduced into the solvent is removed in this way. However, some of the dye materials of fabrics are soluble or partially soluble in the solvent and when retained therein are apt to cause discolorization of other fabrics with which the solvent is brought in contact in subsequent reuse. In addition, various fatty and greasy contaminants, such as fatty acids, soap, tars and the like, will collect in the solvent either in solution or in finely dispersed condition and do not separate readily from the solvent in the conventional filtration treatment. These constituents tend to cause a progressive buildup and become rancid causing a disagreeable odor which renders the solvent unfit for use, even though its cleansing properties are not substantially reduced.

The most effective solvent cleaner used commercially today involves periodic withdrawal of the solvent charge from a given plant location for special treatment in a plant arranged for removal of substantially all contaminant material. The solvent so treated is quite satisfactory for reuse, but the expense of withdrawal, return and treatment places an undue cost on the operation, particularly in some coin operated installations and other plants of limited volume. The usual installation in operating plants includes a filtration station and various types of filtering media have been devised for use at such stations, including disposable cannisters. While these are effective to a degree, they do not remove dye contaminants and are not efficient in removal of the fatty acids and similar materials which develop the rancid odor.

The present invention provides a simple and efficient filtration procedure through utilization of a cannister-type disposable filtration unit which is adapted to be sized and shaped for mounting at existing filtration stations in dry cleaning plants and which effects an essentially complete removal of dye constituents and fatty acids, soaps and tars over long periods of continuous usage without appreciable lessening of the circulating capacity of the plant installation.

Accordingly, it is an object of my invention to provide a simple, durable and economic filtration unit for the treatment of cleaning solvent which is capable of functioning efficiently in continuous use over protracted periods of time.

Another object of my invention is to provide a novel method of filtration of cleaning solvent for removal of contaminant materials in controlled sequence for removal of essentially all of the odor causing and discolorizing contaminants.

Other objects reside in novel combinations and arrangements of parts or constituents, all of which will be described in the course of the following description.

The practice of the invention will be best understood by reference to the accompanying drawings. In the drawings, in the several views of which like parts bear similar reference numerals:

Figure 1:
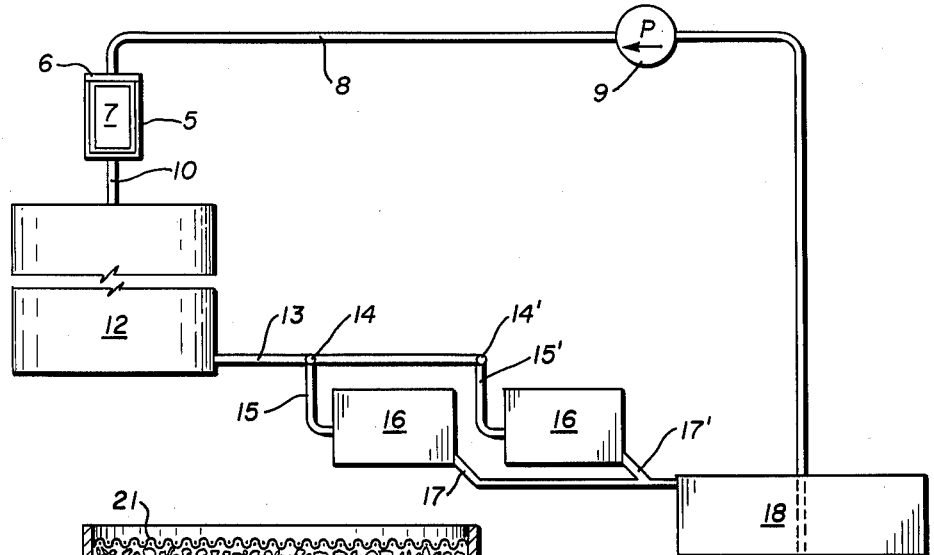
FIG. 1 is a schematic flow sheet arrangement of a typical plant installation utilizing the features of my invention.

A typical plant installation will have a filter housing 5 provided with a removable lid or cover 6 to permit entry and withdrawal of a filtration unit 7 from the housing. A supply line 8 terminates in cover 6 and is sufficiently flexible to permit movement away from housing 5 when the filtration units are being introduced or removed. Supply line 8 is a return line through which circulating solvent is delivered under pressure from a pump 9 for continuous flow through the filtration unit 7 in housing 5. A discharge line 10 conducts clean solvent passing the filter unit 7 into a storage tank 12 or other suitable receptacle. Solvent is withdrawn from tank 12 through a supply line 13 provided with valves 14 along its length to permit selective introduction of a portion of the circulating solvent through branches 15, 15' into one or a plurality of processing stages 16, here shown as two. The plurality of such stations may be any number and the stations may utilize any suitable type of cleaning equipment, including coin operated machines. Upon completion of the cleaning interval at the station 16, the solvent is discharged through branch line 17, 17' into a sump or collecting device 18, preferably including a screening member for effecting liquid-solids separation. A line 19 extends from sump 18 to pump 9 and comprises the intake supply of the pump in such an installation.

The filtration unit of my invention has been shown in FIG. 1 and comprises a cannister-type assembly intended for disposal when it ceases to function effectively. It comprises an elongated hollow body member preferably cylindrical having a screen 21 at the top or intake end and another screen 22 at its bottom or discharge end. Preferably the screens are disposed inwardly from the end of the body to provide a collection space for the intake and discharge of the circulating fluid. The body may be composed of any suitable material, such as waved carboard or paper of the type used in milk distribution, and may be shaped to conform to any type of filtration housing in the installations where it is to be utilized. The interior of the unit is filled with a charge of activated carbon 23 adjoining screen 21. A layer of wood pulp 24 adjoins the activated carbon charge and separates it from a charge of magnesium silicate 25, filling the discharge end of the body. Preferably, a second layer of wood pulp 26 is disposed against screen 22 and the several charges and layers completely fill the interior space of the body between the screens 21 and 22 so as to prevent any outflow of solids during the filtration action.

The arrangement of the charges with respect to the direction of flow involves removal of discolorizing constituents from the circulating solvent by the activated carbon charge. Some of the discolorization is due to the presence of dyes which are not removed by the activated carbon and the wood pulp charge 24 collects and retains the dyes so that the solvent passing layer 24 is essentially clear, but retains fatty acids and similar constituents which tend to become rancid and create on unpleasant odor. The magnesium silicate charge 25 effectively removes such constituents and the final wood pulp layer 26 is provided to further clarify the solvent in the event that a slight discolorization persists as it leaves the magnesium silicate charge 25.

While the interior space of the cannister is substantially filled, the various charges are not packed to impede flow and the volume of the cannister is large enough to permit progressive penetration by the gravitational flow which is spread out sufficiently to settle rapidly through each of said charges. In this way, the retention time in the cannister is held within satisfactory limits without undue retarding of the circulating flow.

The compositions of the material employed as charges in a cannister of the type just described may be of any type or grade within the generic definition used to designate such materials. However, in preferred practice, the wood pulp will be an analytical or commercial grade of wood pulp and the magnesium silicate ($MgSiO_3$) preferably will be pelletized or the granular sand type form so as to provide substantial space or interstices between the pellets or grains comprising the charge. As noted previously, the container may be of any suitable material which will confine the liquid through a protracted period of operation without deterioration or chemical reaction therewith and which is sufficiently low in cost to permit its disposal after an initial period of use without adding undue cost to the operation.

The arrangement of components of the cannister with respect to the direction of flow is an important feature of the invention. The contaminated cleaning solvent is initially screened before entry into the cannister to effect a liquid-solids separation and it then passes into the activated carbon layer for removal of fine dirt particles and other foreign matter tending to cause discolorization, including dyes. Some of the dye material may pass from the carbon charge with the clarified solvent and its passage through the wood pulp layer serves to separate the dyes and other inclusions causing discolorization so that the flow from the intermediate wood pulp layer into the magnesium silicate charge is substantially clear solvent.

Figure 2:
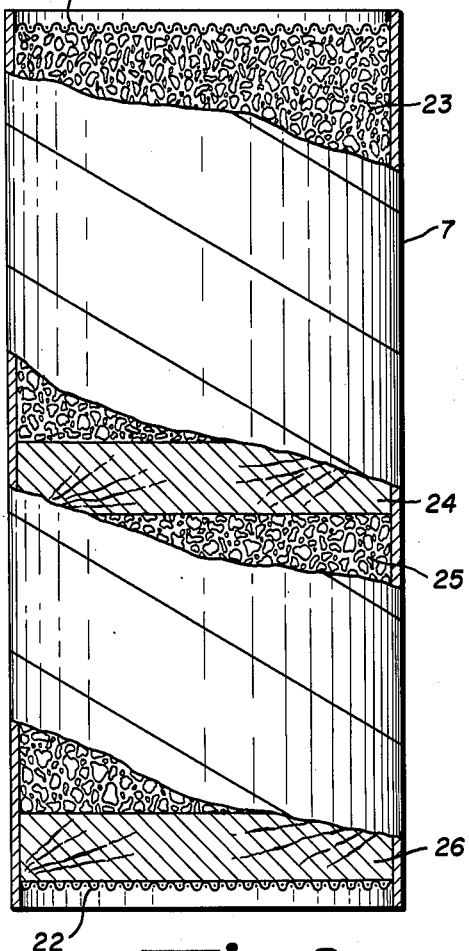
FIG. 2 is a front elevation of a filtration unit embodying features of my invention and partially broken to show interior arrangement of parts and constituents.
Figure 3:
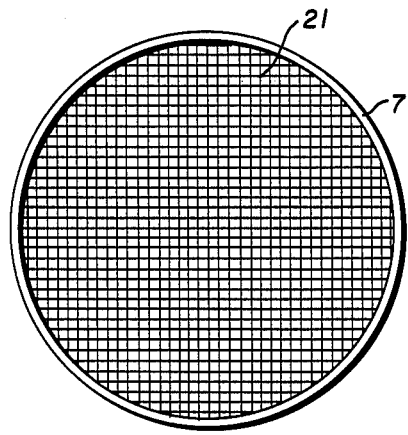
FIG. 3 is a top plan view of the unit shown in FIG. 1.

The drawings illustrate a typical structural arrangement and typical operational procedure for the practice of my invention. The wood pulp layers 24 and 26 in FIG. 2 are hatched for wood, but it will be understood that instead of a single piece as indicated, the layer actually will comprise a wood pulp of the usual formation comprising particles or fragments of irregular shape and variable size. Changes and modifications in the structural arrangement and in the operating procedure may be availed of within the spirit and scope of the invention as defined in the hereunto appended claims.

I claim:

1. A filter for used dry cleaning solvent comprising an elongated hollow body for conducting a circulating flow of cleaning solvent from an intake at one end to a discharge outlet at its opposite end, a charge of activated carbon filling the interior space of the body at its intake end for removing discoloring constituents including dyes, a charge of wood pulp confining the activated carbon to the intake end of the hollow body for spreading the solvent and for removing discoloring constituents including dyes, a charge of granular magnesium silicate filling the interior space toward its discharge end for removing odors and fatty acids, a charge of wood pulp at the discharge end of the body confining the magnesium silicate and for removing discoloring constituents including dyes, and a screening member at each end of the hollow body having openings of a size to pass cleaning solvent and confine the solids charges in the body.

2. A filter for used dry cleaning solvent comprising an elongated hollow body adapted to be mounted in an upright position for conducting a circulating flow of cleaning solvent from an intake at one end to a discharge outlet at its opposite end, a charge of activated carbon filling the interior space of the body at its intake end for removing discoloring constituents including dyes, a charge of wood pulp confining the activated carbon to the intake end of the hollow body for spreading the solvent and for removing discoloring constituents including dyes, a charge of granular magnesium silicate filling the interior space toward its discharge end for removing odors and fatty acids, a charge of wood pulp at the discharge end of the body confining the magnesium silicate and for removing discoloring constituents including dyes, a screening member at each end of the hollow body having openings of a size to pass cleaning solvent and confine the solids charges in the body, and the charges of activated carbon and magnesium silicate being several times the volume of the wood pulp charges.

3. A filter for used dry cleaning solvent comprising an elongated hollow body for conducting a circulating flow of cleaning solvent from an intake at one end to a discharge outlet at its opposite end, a charge of activated carbon filling the interior space of the body at its intake end for removing discoloring constituents including dyes, a charge of wood pulp confining the activated carbon to the intake end of the hollow body for spreading the solvent and for removing discoloring constituents including dyes, a charge of granular magnesium silicate filling the interior space toward its discharge end for removing odors and fatty acids, and a screening member at each end of the hollow body having openings of a size to pass cleaning solvent and confine the solids charges in the body.

4. A filter for used dry cleaning solvent comprising an elongated hollow body adapted to be mounted in an upright position for conducting a gravitational flow of cleaning solvent from an intake opening at its upper end to a discharge outlet at its lower end, the body being substantially wider than the intake opening so as to spread the entering flow in its gravitational movement, a charge of activated carbon filling the interior space of the body at its upper end to a substantial depth for removing discoloring constituents including dyes, a charge of wood pulp of lesser depth confining the activated carbon to the upper end of the hollow body for spreading the solvent and for removing discoloring constituents including dyes, a charge of granular magnesium silicate filling the lower interior space and supporting the wood pulp charge for removing odors and fatty acids, a second charge of wood pulp disposed in the interior of the body below the magnesium silicate charge and for removing discoloring constituents including dyes, and screening members at the respective ends of the hollow body having openings of a size to pass cleaning solvent and confine the solids charges in the body.

5. A method of treating used cleaning solvent in a continuous flow which comprises the successive steps of passing the cleaning solvent through a confined zone by gravitational flow, first removing discoloring constituents including dyes by passing the solvent through a layer of activated carbon in said zone, then removing discoloring constituents including dyes by passing the solvent through a layer of wood pulp in said zone, then removing odors and fatty acids by passing the solvent through a layer of magnesium silicate in said zone, and then removing discoloring constituents including dyes by passing the solvent through a second layer of wood pulp in said zone prior to discharge of the solvent in a cleaned condition from said zone.

6. A method for treating used cleaning solvent comprising the steps of passing a continuous flow of cleaning solvent progressively through successive layers in a confined zone, first confining the incoming solvent for effecting a spread in the flow during its movement through said zone, then removing discoloring constituents including dyes by passing the solvent through a layer of activated carbon in said zone, then removing discoloring constituents including dyes by passing the solvent through a layer of wood pulp in said zone, then removing odors and fatty acids by passing the solvent through a layer of magnesium silicate in said zone, and then removing discoloring constituents including dyes by passing the solvent through a second layer of wood pulp in said zone prior to discharge of the solvent in a cleaned condition from said zone.

References Cited by the Examiner

UNITED STATES PATENTS

| | | | |
|---|---|---|---|
| 1,730,581 | 10/29 | McMachen et al. | 210—283 |
| 1,838,263 | 12/31 | Kelley | 210—290 |
| 1,917,096 | 7/33 | Chamberlin | 210—266 X |
| 1,939,860 | 12/33 | Montgomery | 210—24 X |
| 2,051,126 | 8/36 | Baxter et al. | 210—290 X |
| 2,059,475 | 11/36 | Myers | 8—142 |
| 2,315,410 | 3/43 | Fitz Simons et al. | 8—142 X |
| 2,338,158 | 1/44 | Amsden | 210—489 X |
| 2,353,433 | 7/44 | Auberschek | 210—335 X |
| 2,369,857 | 2/45 | Russell et al. | 210—283 |
| 3,066,519 | 12/62 | Boswinkle et al. | 68—18.1 X |
| 3,099,626 | 7/63 | Riede | 8—142 X |

FOREIGN PATENTS 116,779   4/43   Australia.

MORRIS O. WOLK, *Primary Examiner.*